No. 898,055. PATENTED SEPT. 8, 1908.
W. MacMILLAN.
ELECTRIC BATTERY.
APPLICATION FILED AUG. 18, 1902. RENEWED FEB. 2, 1905.
3 SHEETS—SHEET 3.
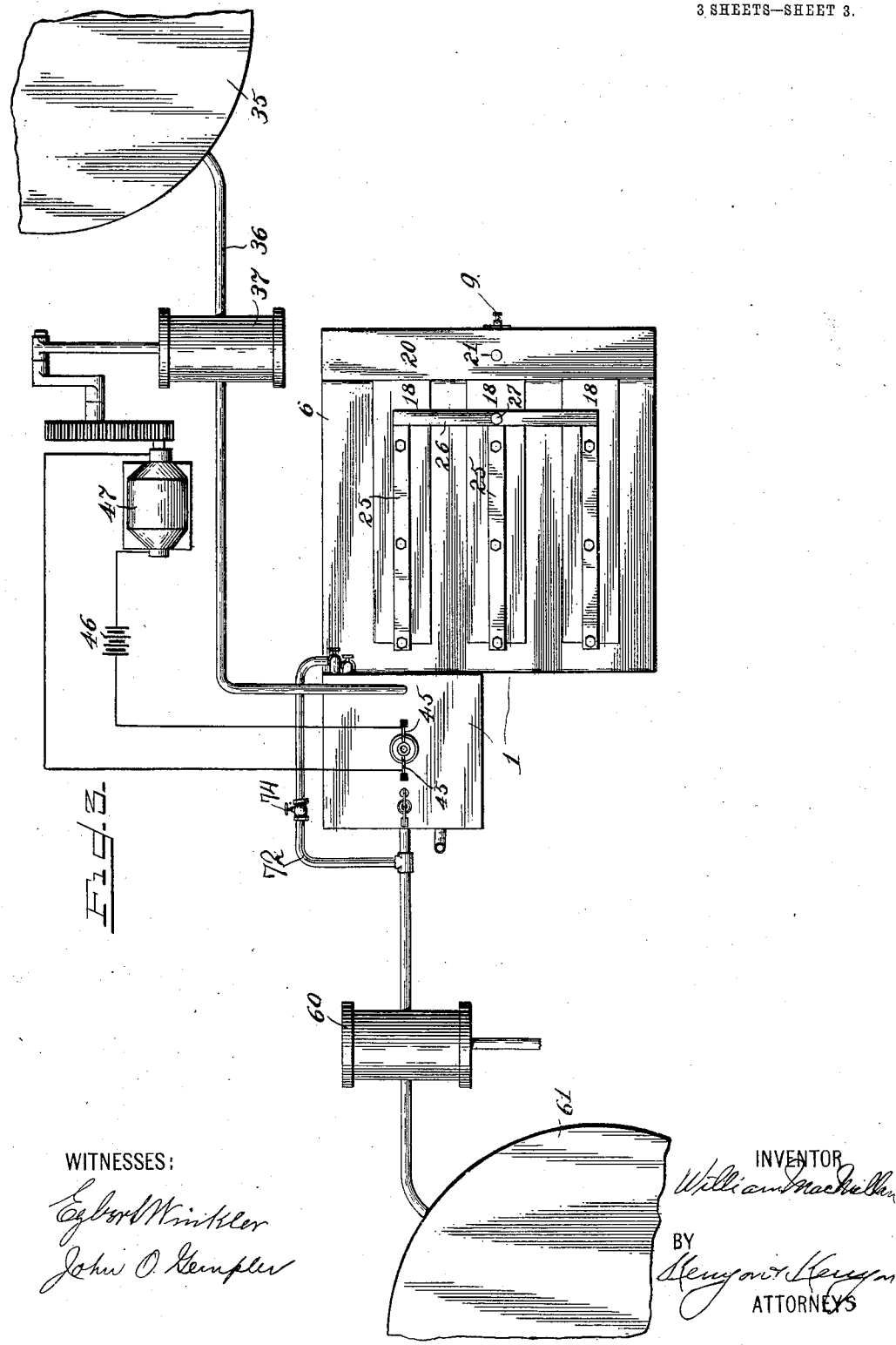
WITNESSES:
INVENTOR
William MacMillan
BY
ATTORNEYS

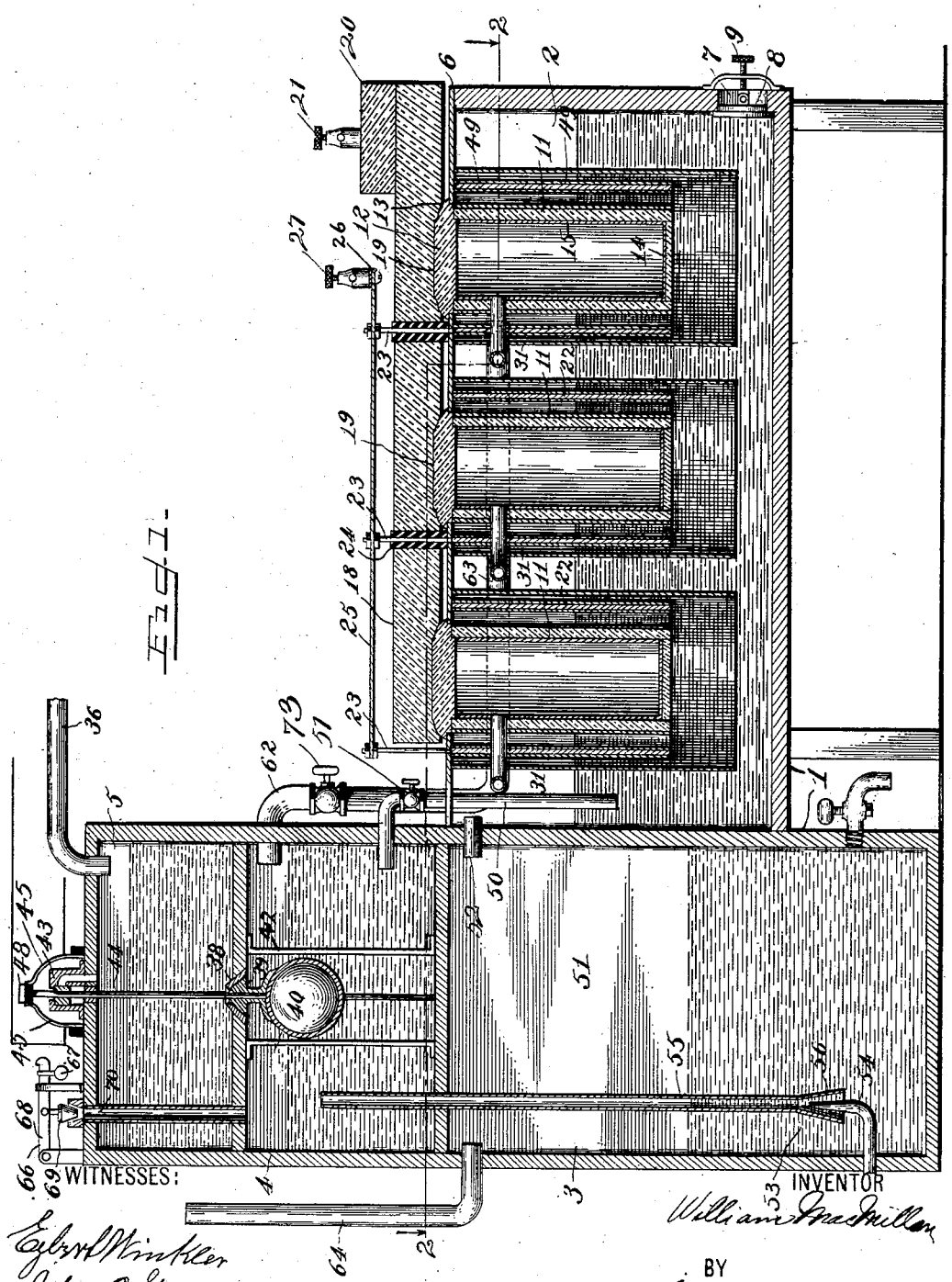

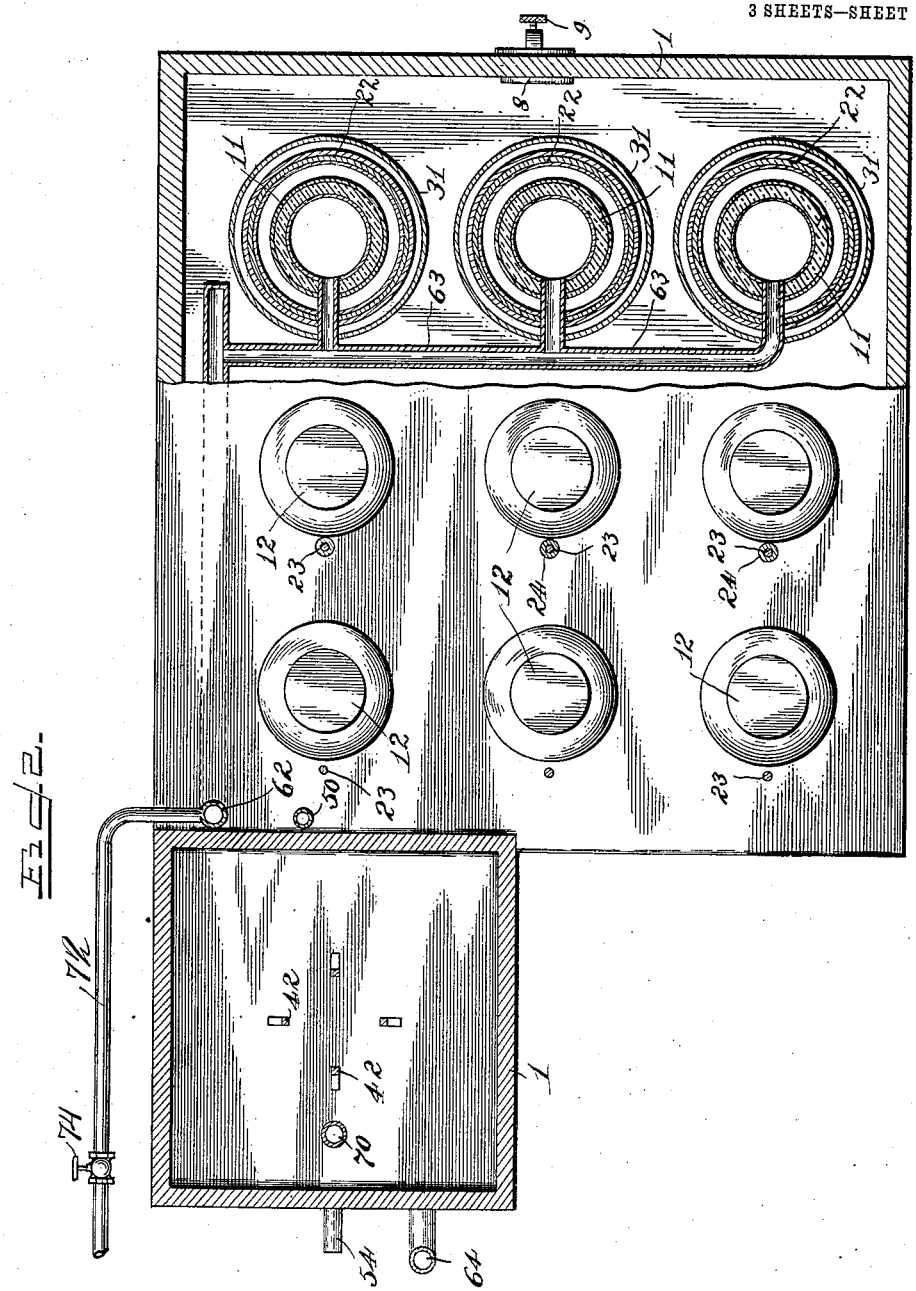

UNITED STATES PATENT OFFICE.

WILLIAM MacMILLAN, OF NEW YORK, N. Y., ASSIGNOR OF ONE-HALF TO EGBERT WINKLER AND ONE-HALF TO JOHN J. WALSH, OF NEW YORK, N. Y.

ELECTRIC BATTERY.

No. 898,055.      Specification of Letters Patent.      Patented Sept. 8, 1908.

Application filed August 18, 1902, Serial No. 120,014. Renewed February 2, 1905. Serial No. 243,812.

*To all whom it may concern:*

Be it known that I, WILLIAM MACMILLAN, a subject of Great Britain, and resident of the city, county, and State of New York, have invented certain new and useful Improvements in Electric Batteries, of which the following is a specification.

My invention relates to batteries, and it has for its object to provide an efficient means for the production of electricity by chemical action.

It also has for its object to provide an efficient de-polarizer for removing the elements of the decomposed substance from the surfaces of the battery plates.

My invention consists in providing a battery having a plurality of positive and negative elements and an insulating body surrounding each pair of the said elements.

The invention also consists in providing a battery having positive and negative elements and a covering for the said elements for preventing the deposit of sediment or products of decomposition upon the elements, and preventing thereby an increased internal resistance.

The invention also consists in providing a battery with a plurality of reservoirs or cisterns, and means for causing the circulation of a fluid through the said battery.

The invention also consists in providing a means for directing a fluid through the elements for de-polarizing the battery.

The invention also consists in automatic means for regulating the supply of the exciting fluid to the battery.

The invention also consists in other features of construction and combinations of parts hereinafter described and claimed.

The invention is illustrated in the accompanying drawings, wherein

Figure 1 illustrates a sectional view of the battery and of the supply reservoirs or cisterns. Fig. 2 illustrates a sectional view taken along the lines 2—2, shown in Fig. 1. In Fig. 2 the means for connecting the like elements of the battery is omitted. Fig. 3 is a diagrammatic view illustrating diagrammatically the connections of the battery with the operating pumps, in case such pumps are used.

Referring to Fig. 1, 1 illustrates a casing containing a receptacle 2 for the elements of the battery, cisterns 3, 4 and 5 containing an exciting fluid which is fed to the said receptacle. The receptacle 2 has a cover 6, which may be of fiber or any other suitable material. The receptacle also has an opening 7 closed by a disk 8, which is sealed by the screw 9. The cover 6 is provided with a number of openings adapted to receive the carbon elements 11, which are in the form of cylinders. The carbon elements have carbon heads 12, molded upon carbon cylinders 11. The heads 12 of the carbons have extending flanges 13, which are adapted to engage with the cover 6 when the carbon cylinder is placed within the opening in the cover. This provides a means for closing the upper end of the carbon cylinder and also of supporting the cylinder in the receptacle 2. The carbon heads 12, are supported upon insulating fiber covering 6, fiber covering 6 is supported upon bars or partitions molded upon receptacle 2.

The lower end of the carbon cylinder 11 is closed by means of a plug, preferably by means of a porous plug 14, which accurately fits into the lower end of the cylinder. A covering 15 is located on the surface of the carbon cylinder. This cover is preferably of fabric, such as cloth. The covering prevents the deposit of any of the products of decomposition directly upon the carbon, and it thus prevents an increased internal resistance.

The carbon cylinders of the battery are connected together by means of carbon strips 18, which are concaved at points 19 and thereby adapted to fit over the carbon heads 12. By this means, a perfect contact is made between the carbon cylinders and the connecting strip 18. The strips 18 are connected together by a cross-strip 20, on which is located a binding post 21. This post 21 forms the positive pole of the battery.

On the under side of the cover 6, and in proximity to the carbon cylinders, are located the positive elements 22 of the battery. These elements may be of zinc or any other desirable metal. The positive elements may be in the form of a rod, or they may be made in the form of a cylinder, or they may be made in any other form. When the positive element of the battery is of a cylindrical form, they may be positioned so as to completely surround the carbon cylinders 11. The positive element may be located substantially concentric therewith.

The positive element may be fastened to the cover of the carbon element by any suitable means. In the device illustrated in the drawing, the elements 22 are provided with rods 23, which extend upward through the cover 6 and the carbon connecting strip 18. The rod 23 is separated from the carbon connecting strip 18 by means of a sleeve 24 of fiber, vulcanite or rubber, which insulates the two parts and prevents any short-circuiting. The upper ends of the rods 23 are connected together by means of metallic connecting strips 25. These strips are connected together by means of a strip 26. Upon this strip is located a binding post 27, which constitutes the negative pole of the battery. When any work is to be done by the battery, the motor or other electrical device is connected with the posts 21 and 27.

The zinc plate has a covering of any suitable material for preventing the deposit of sediment, carbon particles or any products of decomposition on its surface. The covering is preferably in the form of a fabric, such as cloth 49.

In order to separate each pair of positive and negative elements of the battery from the other pairs, an insulating cylinder 31 is provided, which completely surrounds each pair of positive and negative elements. The insulating cylinder 31 may be composed of fiber or insulating paper formed by saturating paper with paraffin, or it may be formed of any other substance which will electrically insulate the pairs of elements from each other. The insulating cylinder 31 is fastened at the top to the cover 6 by sealing wax. The lower end of the cylinder extends considerably below the lower ends of the pairs of elements, and is open to allow free access of the exciting fluid. By this arrangement, the fluid can readily enter the insulating cylinder and surround the elements, but the insulating cylinders will prevent any stray currents from leaving each pair of elements of the battery. This produces practically independent and individual pairs of elements, which may be located in one and the same receptacle.

The exciting fluid, which is used in producing the electricity, may be composed of any well known solution used in connection with electrical batteries. A solution of salammoniac may be used, and if platinum is substituted for the positive element of the battery, a solution of per-chlorid of iron may be used. Sea-water may be used to advantage. The receptacle is filled with the solution nearly to the top.

In order to de-polarize the battery, and thereby greatly reduce the internal resistance of the battery, I provide pipe connections for allowing a de-polarizing fluid to circulate through the elements, and also for allowing an exciting fluid to circulate through the receptacle. The fluid which circulates through the elements consists of preferably a gas, such as oxygen or air, or any decomposing gas, which may operate upon the substance that may be deposited upon the elements of the battery. If the gas is in the form of oxygen, it may be produced by any well known means, and connected directly to the battery by means of pipe connections if supplied under sufficient pressure. If the oxygen is not under pressure greater than the atmosphere, it will be necessary to use a pump for forcing the gas through the elements of the battery. If ordinary air is used for de-polarizing the battery, an air pump may be connected to the battery and the air forced through the elements.

When a very large battery is to be used, an extra supply reservoir may be connected to the battery, and when the exciting fluid diminishes below a certain point, it may be supplied by the operation of an automatically controlled pump. If the supply reservoir containing the exciting fluid is located above the battery, the supply may be controlled by means of a valve automatically controlled.

Referring to Fig. 3, 35 indicates a reservoir for the exciting fluid. This reservoir is connected by means of pipe connections 36 at the top of the casing 1, wherein is located the cistern 5. If the bottom of the reservoir 35 is below the level of the top of the casing 1, the exciting fluid may be pumped into the casing by the operation of the pump 37. The exciting fluid passes from the cistern 5 through the opening 38 located in the bottom of the cistern 5 until the cistern 4 is nearly filled. In the opening 38 there is located a valve and a rubber gasket 39 which closes the opening 38. The valve 39 is operated by a float in the form of a hollow ball, which is raised by the buoyant effect of the exciting fluid. The buoy is surrounded by three or four rods 42, which prevent any lateral displacement of the float 40.

At the top of the cistern 5 there is located an air valve 43, which is operated by means of a rod 44 connected to the buoy 40. When the buoy 40 is allowed to lower, because of the lowering of the level of the exciting fluid in the cistern 4, the valve 43 is opened, as well as valve 39, and the air is allowed to pass into the cistern 5, while at the same time, the exciting fluid located in the cistern 5 is permitted to pass out through the opening 38 into the cistern 4. A contact 48 is also located on the rod 44, and is adapted to close electric connections between the contacts 45, when the rod is pulled down. A motor 47 for operating the pump 37 is connected to the contacts 45. When the rod is in this position, the fluid is allowed to pass from the cistern 5 into the cistern 4, and the air is allowed to enter in the air valve 43, and the circuit is closed from the battery 46 to the motor 47, which operates the pump 37. This supplies the cistern 5 with a fresh supply of a fluid from the reservoir 35. If, however, the reservoir 35 is located above the top of the casing 1, a valve controlling device may be substituted for the motor 47. Under this arrangement, when the rod 44 is pulled down by the weight of the buoy or float 40 so as to close connections through the battery 46, a circuit is completed through an electric valve controlling device, which opens a valve located in the pipe 36, and allows the exciting fluid to flow into the cistern 5. When the fluid from the cistern 5 nearly fills cistern 4, the buoy or float 40 is raised, and the valves 39 and 43 are closed, and the circuit through the motor 47 is broken.

The exciting fluid is fed from the reservoir 4 into the receptacle 2 by means of the pipe 50, which has a regulating valve 51. The exciting fluid is allowed to fill the receptacle nearly to the top of the elements of the battery. When it reaches this point it flows from the receptacle to the exit tube 52 into the cistern 3 located at the bottom of the casing 1. From the cistern 3 is it forced again to cistern 4 by a pumping means, such as by an injector or by any other well known means. This permits of the circulation of the fluid through the receptacle containing the elements of the battery.

In order to raise the fluid from the cistern 3 to the cistern 4, I have provided an injector 53 having an injector nozzle 54, which is directed into a pipe 55 having a conical opening 56. A de-polarizing gas, such as air or oxygen may be directed upward through the tube 55 and by the suction of the gas produced by its upward motion, draw the exciting fluid from the cistern 3 into the cistern 4. The exciting fluid will then pass from the cistern 4, through the pipe 50, into the receptacle 2.

If a gas under pressure is used to operate the injector 53, it may be connected directly to the nozzle 54, but if the gas is not under pressure greater than that of the atmosphere, a pump 60 may be used to force the gas through the injector 53. If ordinary atmospheric air is used, the pump may be connected directly to the injector. If any other gas is used, it may be contained in a reservoir 61, which may be connected to the pump 60 and the gas forced by the pump into the injector 53.

As the de-polarizing fluid passes through the tube 55 it is thoroughly mixed with the exciting fluid and a part of it circulates with the exciting fluid through the receptacle containing the elements of the battery and acts to de-polarize the battery. The de-polarizing fluid which does not mix with the exciting fluid, rises to the surface of the exciting fluid in the cistern 4, where it is forced by means of its own pressure through a pipe 62, connected to the cistern 4 at a point above the level of the exciting fluid. The pipe 62 is connected to the inner elements of each of the pairs of the battery by means of the branches 63. The branches 63 pass through the insulating cylinders 31 and the outer elements 22, and open into the carbon elements 11. The de-polarizing fluid enters into the inner element and is forced through the pores of the said element. By this means, the exciting fluid is completely stirred, and the deposit of salts or carbon on the elements is entirely avoided. The de-polarizing fluid passes with the exciting fluid into the cistern 3, carrying with it fluids or gases that may be produced by the action of the exciting fluid on the elements of the battery. The de-polarizing fluid, together with such gases that may be thus produced, pass through the pipe 64 into the atmosphere. If it is desirable, an opening may be made in the receptacle 2 to allow the gases to escape directly into the atmosphere from the receptacle.

The pipe 62 leading to the interior of the elements of the battery may be connected directly to the pump or de-polarizing gas reservoir, or it may be supplied from both the cistern 4 and directly from the pump or reservoir. I have illustrated a pipe connection 72 connecting the pump 60 and the pipe 62. The pipes 62 and 72 are provided with valves 73 and 74 respectively, so that either of the connections may be used to supply the de-polarizing fluid.

In order to regulate the pressure of the de-polarizing fluid in the cistern 4, there is provided a safety valve 66 of any well known type. I have illustrated the well known lever form of a safety valve having a weight 67 located at the end of the lever 68. A valve 69 is connected to the lever 68, and closes the end of the pipe 70 which is connected to the cistern 4. When the pressure of the gas in the cistern 4 rises to a predetermined point, the valve 69 will be lifted, and some of the gas will escape, when the valve 67 again closes the valve 69.

What I have described and illustrated is a preferable form of my invention. The details of construction, however, may be varied without, in any way, departing from the spirit of my invention.

What I claim as new, and desire to secure by Letters Patent is as follows:—

1. In a primary battery the combination of a receptacle, a pair of positive and negative elements located within the said receptacle, a lining located on the exterior of one of said elements and linings located on the interior and the exterior of the other of said elements, an insulating cylinder surrounding the said elements.

2. In a primary battery the combination of a receptacle, a plurality of concentric elements located within the said receptacle, cloth linings covering the exterior of each of the said elements, an insulating cylinder surrounding the said elements.

3. In a primary battery the combination of a receptacle, a negative element having a conductive head and an exterior lining of cloth, a positive element surrounding the said negative element and having interior and exterior linings of cloth, an insulating cylinder surrounding the said elements.

4. In a primary battery the combination of a plurality of pairs of concentric elements, the inner of the said elements having conductive heads, the outer of the said elements having conductive posts, conductive strips for connecting the said heads and the said posts together, an insulating cylinder surrounding each pair of elements.

5. In a primary battery the combination of a receptacle, a pair of concentric cylindrical elements located within the said receptacle, a porous plug located in the lower end of the inner of the said elements, an insulating cylinder surrounding the said elements and having an opening at the lower end thereof.

6. In a primary battery the combination of a receptacle, a plurality of concentric cylindrical elements located within the said receptacle, the inner of the said elements being composed of carbon and having a carbon head, the outer of the said elements having conductive posts, a carbon strip for connecting the heads of the said inner elements, a conductive strip for connecting the said posts.

7. In a primary battery the combination of a receptacle, a plurality of pairs of concentric cylindrical elements located within the said receptacle, the inner of the said elements having a carbon head, the outer of the said elements having a conductive post, a carbon strip for connecting the said carbon heads and a conductive strip for connecting the said posts, an insulating cylinder surrounding each pair of the said elements.

8. In a primary battery the combination of a receptacle, a plurality of hollow negative elements and a plurality of positive elements, an inlet pipe connected to the interior of each of said negative elements, an inlet and an exit pipe connected to the said receptacle, whereby a fluid is allowed to circulate about the said elements.

9. In a primary battery the combination of a receptacle, a plurality of pairs of concentric cylindrical elements, an insulating cylinder surrounding each of said pairs, an inlet tube connecting the interior of each of said pairs, whereby a gas may pass into the said elements, an inlet and an exit tube connected to the said receptacle, whereby an exciting fluid may circulate through the said receptacle.

10. In a primary battery the combination of a receptacle, a plurality of pairs of concentric cylindrical elements located within the said receptacle, a porous plug located at the lower end of each of the inner of the said elements, an inlet pipe connected to the inner of the said elements, and pipes connected to the said receptacle to permit a fluid to circulate about the said elements.

11. In a primary battery the combination of a receptacle, a plurality of pairs of concentric cylindrical elements located within the said receptacle, a porous plug located at the lower end of one of the said elements, an inlet pipe connected to one of said elements, an insulating cylinder surrounding and extending below the said elements and having at its lower end an opening, an inlet and exit pipe connected to the said receptacle, whereby a fluid may be allowed to circulate about the said elements.

12. In a primary battery the combination of a plurality of reservoirs, a float valve for controlling the connections between the said reservoirs, an air valve controlled by the said float valve, a receptacle having elements connected by pipes to the second named receptacle whereby the fluid of one of the said reservoirs is allowed to pass into the other of the said reservoirs and into the same elements.

13. In a primary battery the combination of a plurality of reservoirs, an injector for forcing the fluid from one reservoir to a second reservoir, a safety valve for controlling the pressure produced in one of said reservoirs, a gas escape tube connected with another of the said reservoirs, a receptacle having elements connected to the said reservoirs, whereby fluid may be allowed to circulate through the said receptacles.

14. In a circulating system the combination of a gas reservoir, a supply reservoir, a plurality of fluid reservoirs, a float valve contained in one of said reservoirs, a supply pipe connected between two other of said reservoirs, means connected with the said float valve for controlling the flow of a fluid through the said supply pipe, an injector tube for forcing a fluid from another of said reservoirs into the reservoir containing the said float valve, a receptacle having concentric elements connected to one of the said reservoirs, the said receptacle being also connected to another of the said reservoirs, whereby the flow of fluid to the said receptacle is controlled by the said valve.

15. In a primary battery the combination of a gas reservoir, a plurality of reservoirs containing an exciting fluid, a supply pipe connected between two of said reservoirs, means for controlling the flow of fluid through the said supply pipe, a float valve contained in another of the said reservoirs and controlling the flow of a fluid from one of the last-named reservoirs to a third reservoir, an injector tube connecting the said third reservoir to a fourth reservoir, a receptacle having a plurality of pairs of concentric cylindrical elements, an inlet pipe connected to one of said reservoirs and to the interior of each pair of the said elements, and an exit connected between the said receptacle and another of said reservoirs.

In testimony whereof, I have signed my name to this specification, in the presence of two subscribing witnesses.

WILLIAM MacMILLAN.

Witnesses:
    EDWIN SEGER,
    JOHN E. TEMPLER.